(12) United States Patent
Nuss et al.

(10) Patent No.: US 6,623,220 B2
(45) Date of Patent: Sep. 23, 2003

(54) QUICK CHANGE MANDREL ASSEMBLY FOR USE WITH A HOLE SAW AND A PILOT DRILL BIT

(75) Inventors: Bart Nuss, Fisherville, KY (US); Gregory A. Phillips, LaGrange, KY (US); Richard L. Hall, Lincolnton, NC (US); Kevin M. Ward, Louisville, KY (US)

(73) Assignee: Credo Tool Corporation, Broadview, IL (US)

( * ) Notice: Subject to any disclaimer, the term of this patent is extended or adjusted under 35 U.S.C. 154(b) by 0 days.

(21) Appl. No.: 09/943,069

(22) Filed: Aug. 30, 2001

(65) Prior Publication Data

US 2002/0028117 A1 Mar. 7, 2002

Related U.S. Application Data

(60) Provisional application No. 60/230,526, filed on Sep. 1, 2000.

(51) Int. Cl.[7] .................. B23B 51/04; B23B 31/107
(52) U.S. Cl. .................. 408/204; 279/75; 279/905
(58) Field of Search .................. 279/22, 30, 75, 279/905; 408/204–206, 208, 209, 703

(56) References Cited

U.S. PATENT DOCUMENTS

| | | | |
|---|---|---|---|
| 1,119,276 A | * | 12/1914 | Griffith et al. .................. 279/30 |
| 2,062,257 A | | 11/1936 | Douglas et al. |
| 3,374,696 A | | 3/1968 | Trevathan |
| 3,387,637 A | | 6/1968 | Ferguson et al. |
| 3,430,526 A | | 3/1969 | Valenziano |
| 3,559,513 A | | 2/1971 | Hougen |
| 3,880,546 A | | 4/1975 | Segal |
| 4,036,560 A | | 7/1977 | Clark et al. |
| 4,069,824 A | | 1/1978 | Weinstock |
| 4,072,441 A | | 2/1978 | LaPointe |
| 4,303,357 A | | 12/1981 | Makar |
| 4,579,486 A | | 4/1986 | Damico |
| 4,741,651 A | | 5/1988 | Despres |
| 4,755,087 A | | 7/1988 | Parent |
| 4,818,157 A | | 4/1989 | Kouvelis |
| 4,968,189 A | | 11/1990 | Pidgeon |
| 5,035,548 A | | 7/1991 | Pidgeon |
| 5,061,126 A | | 10/1991 | Cain et al. |
| 5,076,741 A | | 12/1991 | Littlehorn |
| 5,082,403 A | | 1/1992 | Sutton et al. |

(List continued on next page.)

FOREIGN PATENT DOCUMENTS

| | | |
|---|---|---|
| JP | 2000107919 | 4/2000 |
| WO | WO 97/15413 | 5/1997 |

*Primary Examiner*—Steven C. Bishop
(74) *Attorney, Agent, or Firm*—Maginot, Moore & Bowman (57) ABSTRACT

A mandrel assembly is usable with a hole saw and a drill bit. The mandrel assembly includes a body having a shank portion and an adapter receiving portion. The adapter receiving portion defines an adapter receiving cavity and including a first wall having a first detent hole extending therethrough. The mandrel assembly further includes a bit coupler secured to the body. The bit coupler is located within the adapter receiving cavity and defines a drill bit receiving portion. The drill bit receiving portion includes a bit receiving cavity and a second wall having a second detent hole extending therethrough. The mandrel assembly further includes an adapter configured to be received within the adapter receiving cavity, the adapter having an externally threaded portion configured to meshingly engage with a set of internal threads of the hole saw, the adapter further having a first detent groove defined in an outer surface thereof. The mandrel assembly also includes a first ball detent located within the first detent hole of the body and is configured to be received within the first detent groove of the adapter. Moreover, the mandrel assembly includes a second ball detent located within the second detent hole of the bit coupler and is configured to be received within a second detent groove of the drill bit.

26 Claims, 12 Drawing Sheets

U.S. PATENT DOCUMENTS

| | | |
|---|---|---|
| 5,096,341 A | 3/1992 | Despres |
| 5,154,552 A | 10/1992 | Koetsch |
| 5,174,696 A * | 12/1992 | Bogner ............... 408/206 |
| 5,427,482 A * | 6/1995 | Asano et al. ............ 279/905 |
| 5,435,672 A | 7/1995 | Hall et al. |
| 5,597,274 A | 1/1997 | Behner |
| 5,803,677 A | 9/1998 | Brutscher et al. |
| 5,813,802 A * | 9/1998 | Ajimi et al. ............. 408/204 |
| 6,250,856 B1 * | 6/2001 | Miyanaga ............... 408/204 |
| 6,379,089 B1 * | 4/2002 | Sugiura et al. ........... 408/204 |

* cited by examiner

QUICK CHANGE MANDREL ASSEMBLY FOR USE WITH A HOLE SAW AND A PILOT DRILL BIT

This application claims the benefit of U.S. Provisional Application Serial No. 60/230,526 filed Sep. 1, 2000.

BACKGROUND OF THE INVENTION

The present invention relates generally to a mandrel assembly adapted to attach a hole saw and a pilot drill bit to an electric drill.

Numerous mandrel assemblies have heretofore been designed which are adapted to attach a hole saw and a pilot drill bit to an electric drill. However, some of these existing mandrel assemblies tend to be somewhat difficult to use by an operator. For example, attachment and release of the drill bit and the hole saw from such mandrel assemblies tend to be difficult to achieve by the operator. In addition, other of these mandrel assemblies are complicated in construction thereby increasing their manufacturing cost.

What is needed therefore is a mandrel assembly adapted to attach a hole saw and a pilot drill bit to an electric drill which overcomes one or more drawbacks of the previously designed mandrel assemblies.

SUMMARY OF THE INVENTION

In accordance with one embodiment of the present invention, there is provided a mandrel assembly for use with a hole saw and a drill bit. The mandrel assembly includes a body having a shank portion and an adapter receiving portion. The adapter receiving portion defines an adapter receiving cavity and includes a first wall having a first detent hole extending therethrough. The mandrel assembly further includes a bit coupler secured to the body. The bit coupler is located within the adapter receiving cavity and defines a drill bit receiving portion. The drill bit receiving portion includes a bit receiving cavity and a second wall having a second detent hole extending therethrough. The mandrel assembly also includes an adapter configured to be received within the adapter receiving cavity. The adapter has an externally threaded portion configured to meshingly engage with a set of internal threads of the hole saw, the adapter further has a first detent groove defined in an outer surface thereof. Moreover, the mandrel assembly includes a first ball detent located within the first detent hole of the body and is configured to be received within the first detent groove of the adapter. The mandrel assembly additionally includes a second ball detent located within the second detent hole of the bit coupler and is configured to be received within a second detent groove of the drill bit.

Pursuant to another embodiment of the present invention, there is provided a cutting assembly. The cutting assembly includes a hole saw having a set of internal threads. The cutting assembly further includes a body having a shank portion and an adapter receiving portion, the adapter receiving portion defining an adapter receiving cavity and including a first wall having a first detent hole extending therethrough. The cutting assembly additionally includes a bit coupler located within the adapter receiving cavity and defining a drill bit receiving portion, the drill bit receiving portion including a bit receiving cavity and a second wall having a second detent hole extending therethrough. Moreover, the cutting assembly includes an adapter configured to be received within the adapter receiving cavity, the adapter having external threads which engage internal threads of the hole saw, the adapter further having a first detent groove defined therein. The cutting assembly yet further includes a first ball detent located within the first detent hole of the body and is configured to be received within the first detent groove of the adapter. Also, the cutting assembly includes a drill bit configured to be received within the drill bit receiving portion of the bit coupler, the drill bit having a second detent groove defined therein. The cutting assembly moreover includes a second ball detent located within the second detent hole of the bit coupler and is configured to be received within the second detent groove of the drill bit.

According to still another embodiment of the present invention, there is provided a mandrel assembly for use with a hole saw and a drill bit. The mandrel assembly includes a body having (i) a shank portion configured to be received in a chuck of a drill, and (ii) an adapter receiving portion which includes a detent hole extending through a wall thereof and further that defines an adapter receiving cavity. The mandrel assembly further includes a bit coupler secured to the body, the bit coupler being located within the adapter receiving cavity and defining a drill bit receiving portion. The mandrel assembly additionally includes an adapter configured to be received within the adapter receiving cavity, the adapter having a first coupling portion configured to cooperate with a second coupling portion of the hole saw, the adapter further having a detent groove defined therein. Also, the mandrel assembly includes a detent located within the detent hole of the body and configured to be received within the detent groove of the adapter.

It is therefore an object of the present invention to provide a new and useful mandrel assembly.

It is another object of the present invention to provide an improved mandrel assembly.

It is yet another object of the present invention to provide a mandrel assembly which facilitates quick attachment and release of the drill bit and the hole saw.

It is still another object of the present invention to provide a mandrel assembly which is relatively simple in construction.

Other objects and benefits of the present invention can be discerned from the following description and accompanying drawings.

DESCRIPTION OF THE PREFERRED EMBODIMENTS

While the invention is susceptible to various modifications and alternative forms, specific embodiments thereof has been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

First Embodiment

Figure 1:
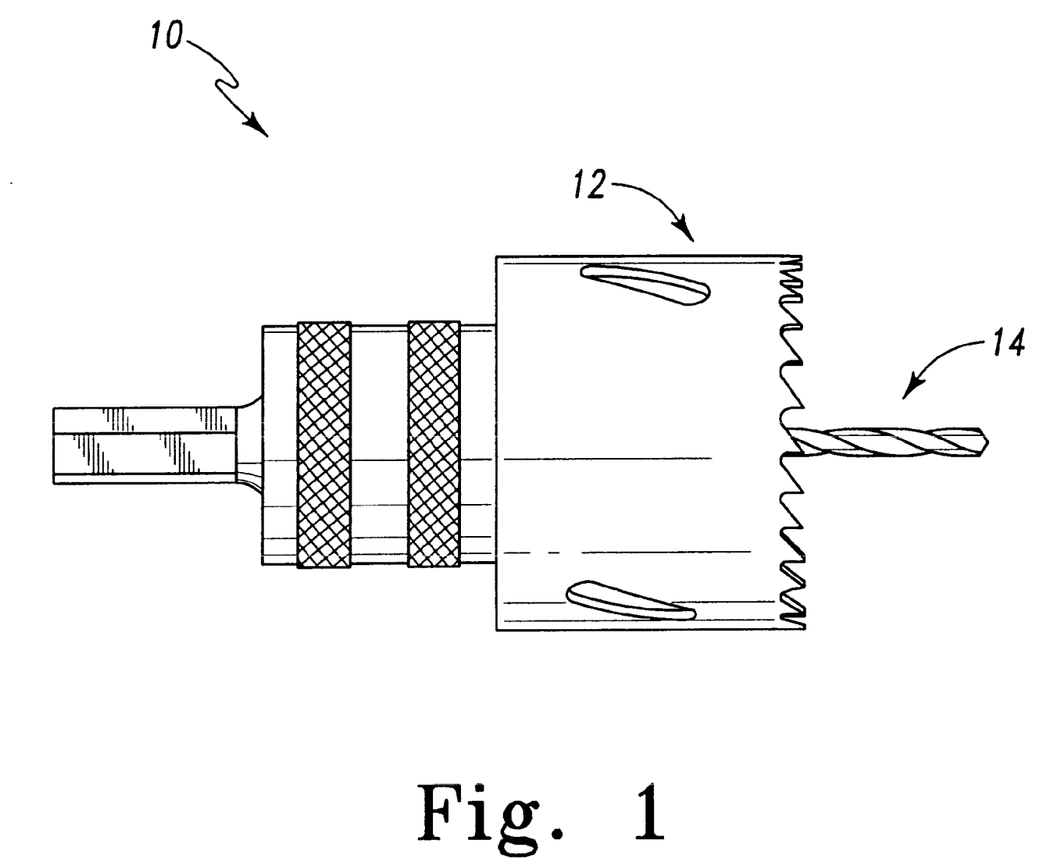
FIG. 1 is a side elevational view of a first embodiment of a mandrel assembly that incorporates the features of the present invention therein.
Figure 2:
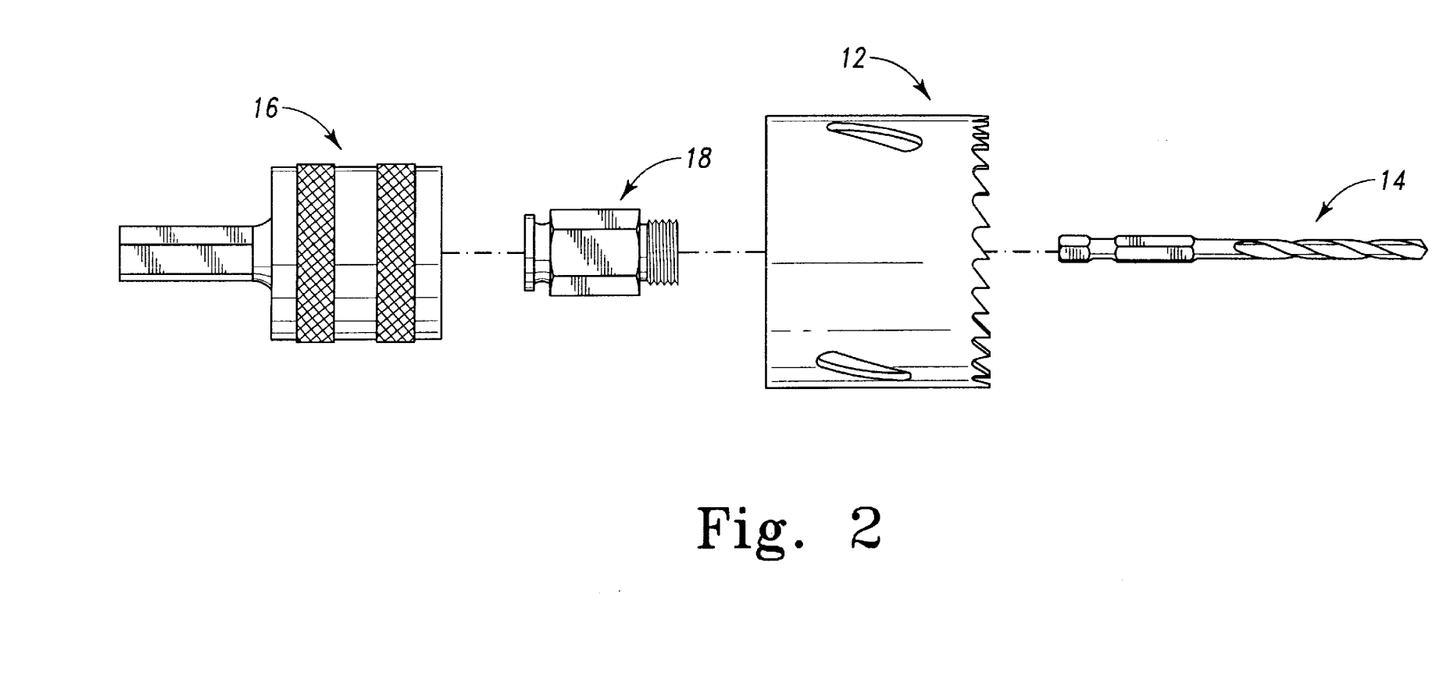
FIG. 2 is a disassembled side elevational view of the mandrel assembly of FIG. 1.

Referring now to FIGS. 1–2, there is shown a first embodiment of a mandrel assembly 10 which is adapted to attach a hole saw 12 and a pilot drill bit 14 to an electric drill (not shown). The mandrel assembly 10 includes two main components, namely, a base mechanism 16 and an adapter 18.

Figure 3:
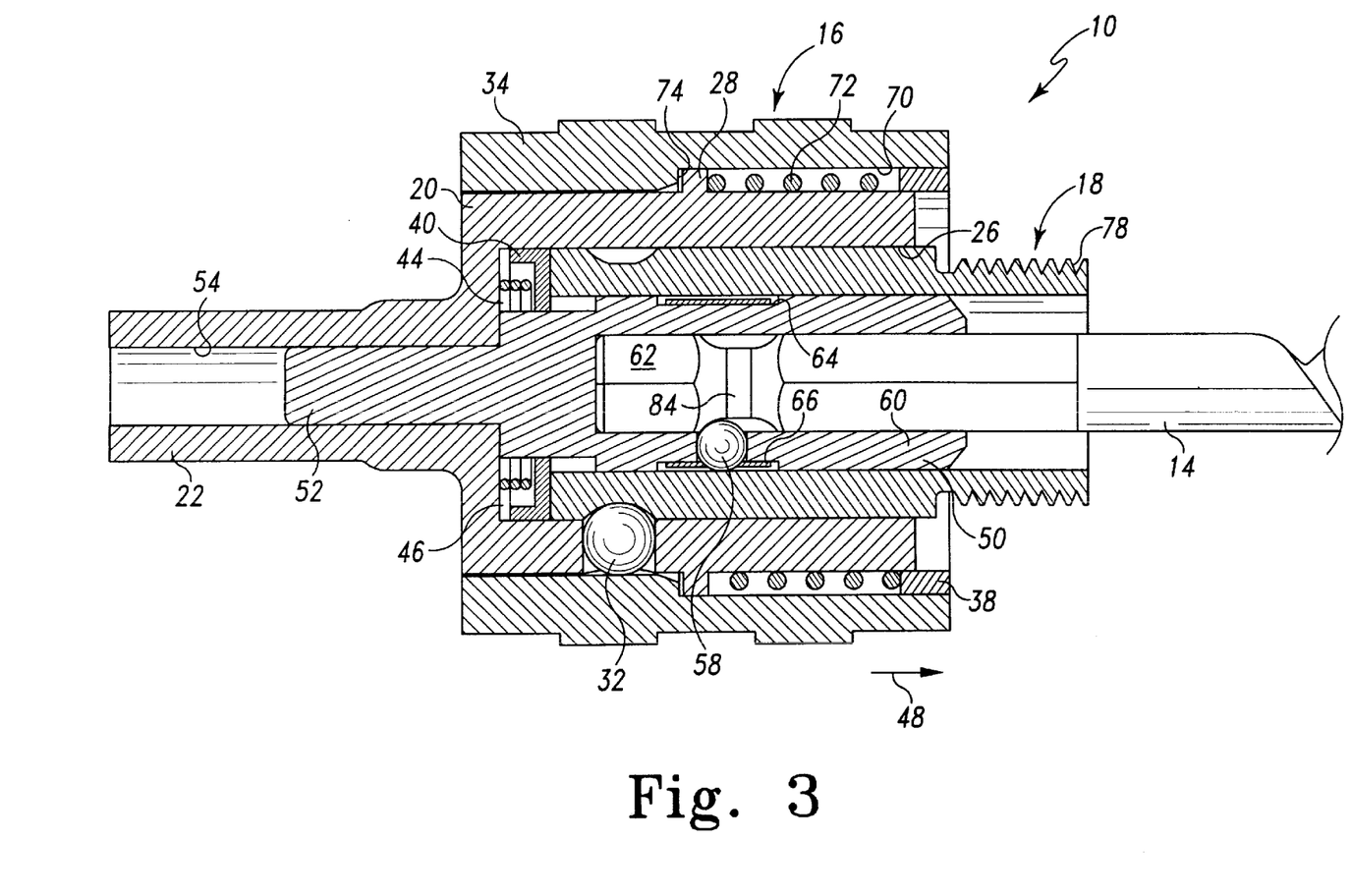
FIG. 3 is a sectional view of the mandrel assembly of FIG. 1.
Figure 4:
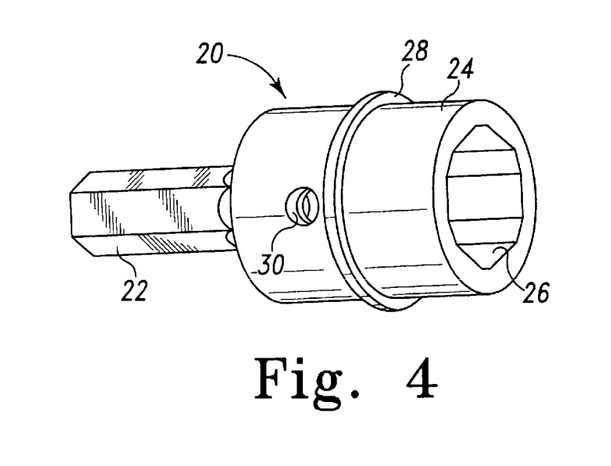
FIG. 4 is a perspective view of the body of the mandrel assembly of FIG. 1.
Figure 5:
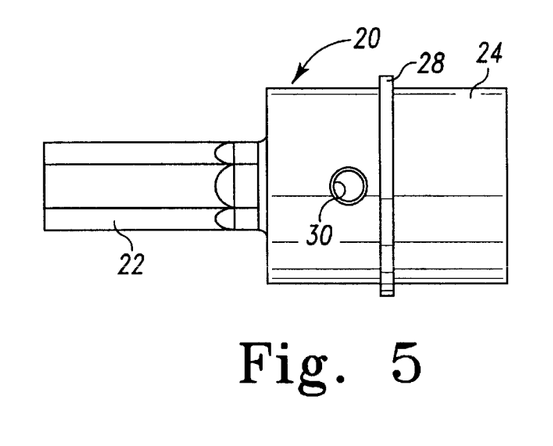
FIG. 5 is a side elevational view of the body of FIG. 4.
Figure 6:
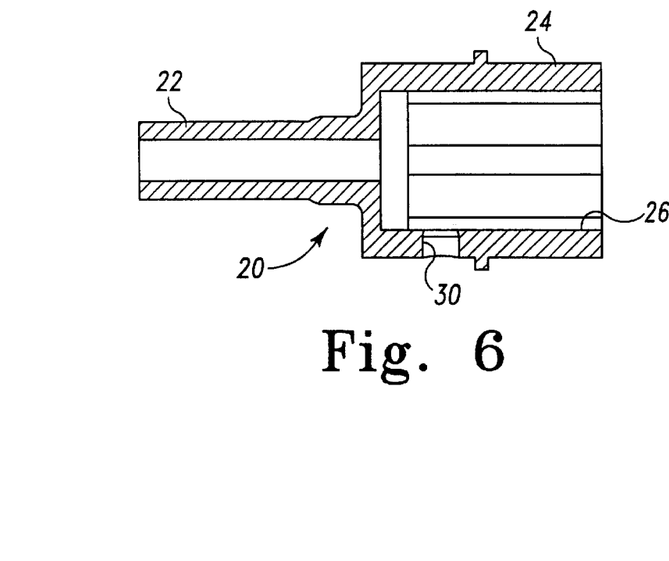
FIG. 6 is a cross sectional view of the body of FIG. 4.
Figure 7:
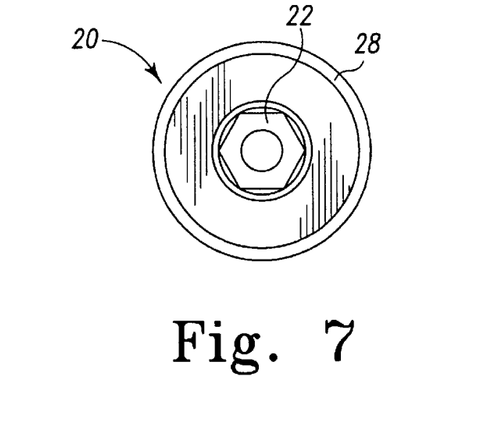
FIG. 7 is a front elevational view of the body of FIG. 4.
Figure 8:
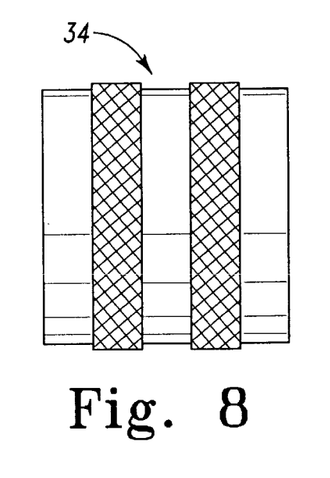
FIG. 8 is a side elevational view of the collar of the mandrel assembly of FIG. 1.

As shown in FIGS. 3–7, the base mechanism 16 includes a body 20 having a hexagonally-shaped shank 22 which is configured to be received within a chuck of the electric drill (not shown). The body 20 includes a cylindrical portion 24 which defines a cavity 26. The body 20 is formed to include a shoulder 28 which extends outwardly from the cylindrical portion 24. The cylindrical portion 24 has defined therein an opening 30 adapted to receive a ball 32 as shown in FIG. 3.

Figure 9:
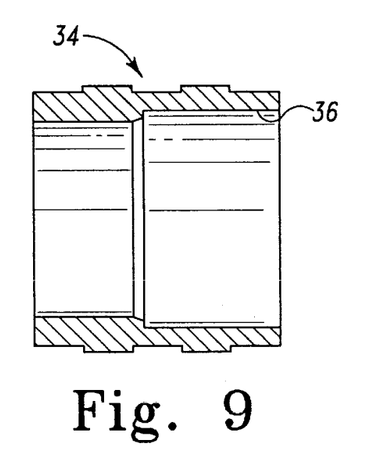
FIG. 9 is a cross sectional view of the collar of the FIG. 8.
Figure 10:
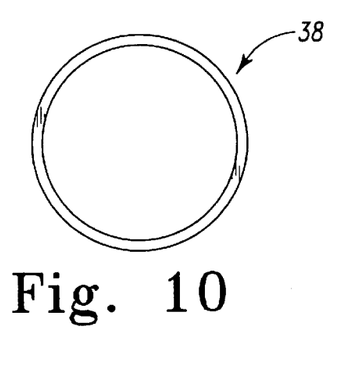
FIG. 10 is a front elevational view of the annular sleeve of the mandrel assembly of FIG. 1.
Figure 11:
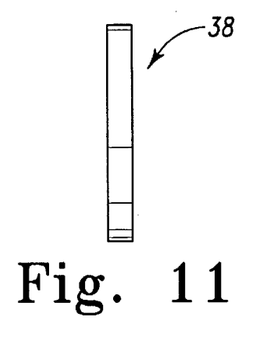
FIG. 11 is a side elevational view of the annular sleeve of FIG. 10.

The base mechanism 16 further includes a collar 34 which is movable in relation to the body 20. The collar 34 is positioned around the cylindrical portion 24 of the body 20 as shown in FIG. 3. The collar 34 defines a passageway 36 extending therethrough as shown in FIG. 9. An annular sleeve 38 is attached to the collar 34 and positioned within the passageway 36.

Figure 12:
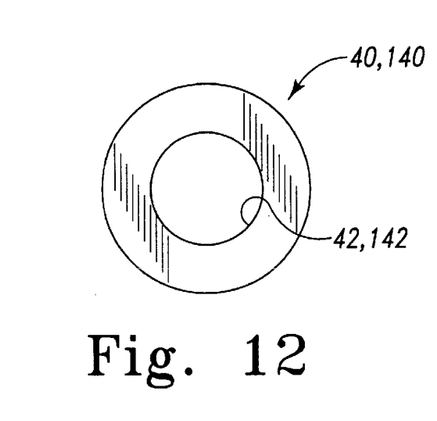
FIG. 12 is a front elevational view of the ring-shaped platform of the mandrel assembly of FIGS. 1 and 28.
Figure 13:
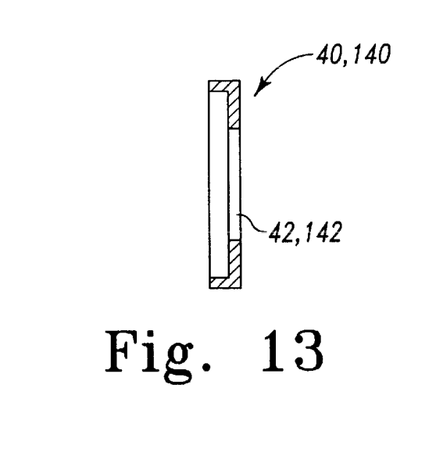
FIG. 13 is a cross sectional view of the ring-shaped platform of the FIG. 12.
Figure 14:
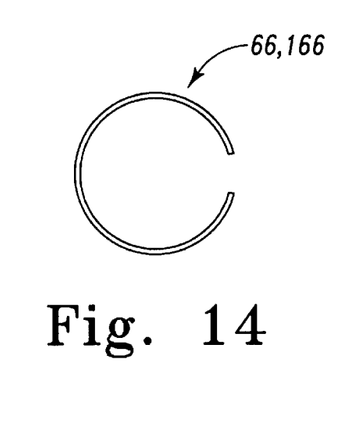
FIG. 14 is a front elevational view of the retaining band of the mandrel assembly of FIGS. 1 and 28.
Figure 15:
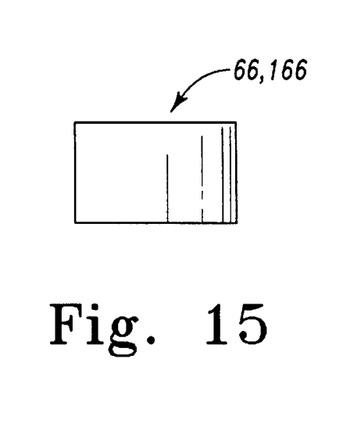
FIG. 15 is a first side elevational view of the retaining band of FIG. 14.
Figure 16:
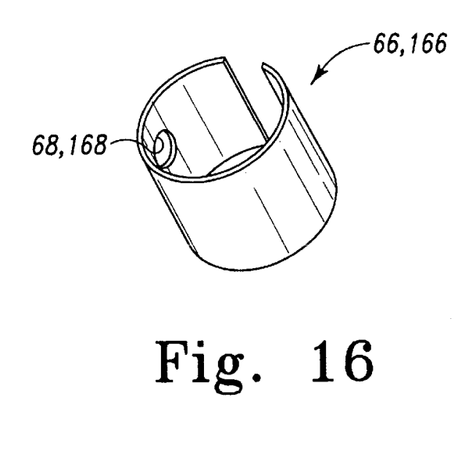
FIG. 16 is a perspective view of the retaining band of FIG. 14.
Figure 17:
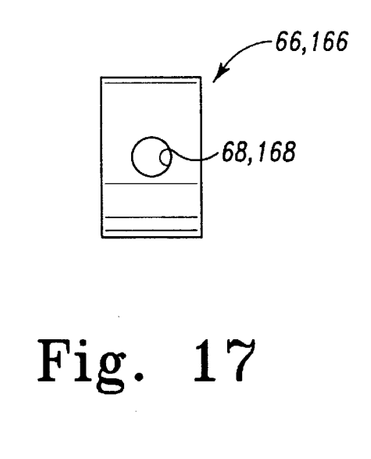
FIG. 17 a second side elevational view of the retaining band of FIG. 14.
Figure 18:
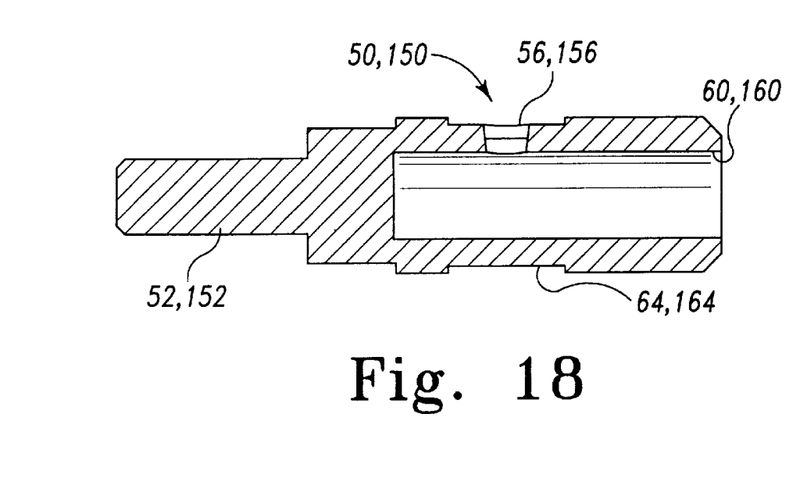
FIG. 18 is a cross sectional view of the bit coupler of the mandrel assembly of FIGS. 1 and 28.
Figure 19:
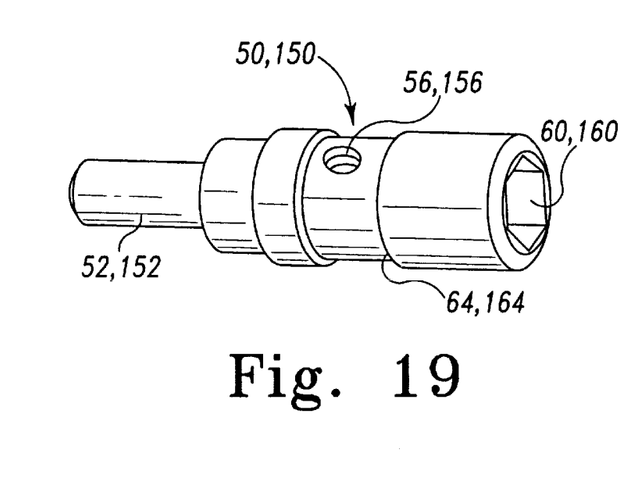
FIG. 19 is a perspective view of the bit coupler of FIG. 18.
Figure 20:
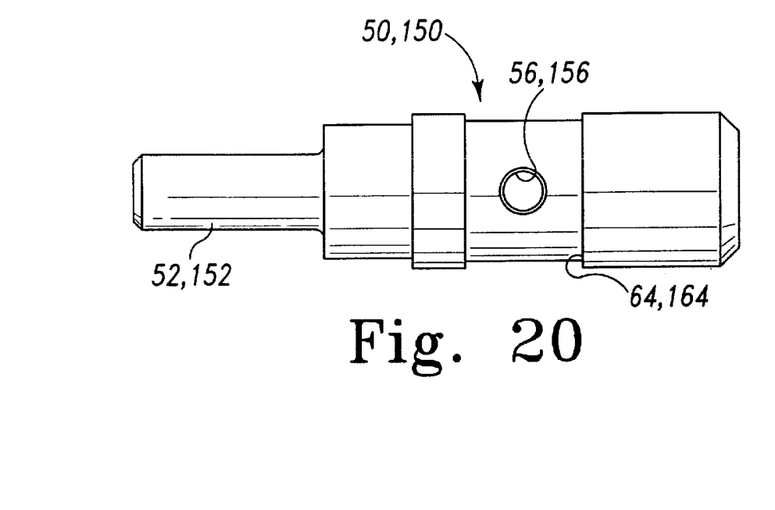
FIG. 20 is a side elevational view of the bit coupler of FIG. 18.
Figure 21:
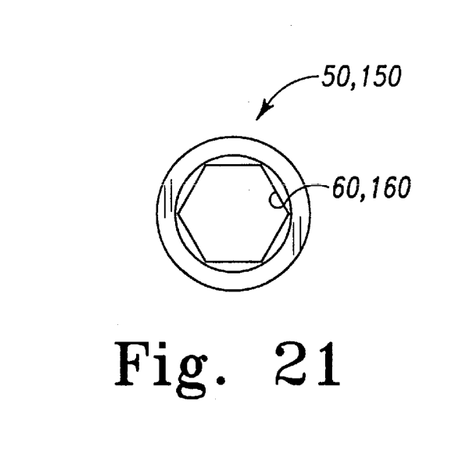
FIG. 21 is a front elevational view of the bit coupler of FIG. 18.

Additionally, the base mechanism 16 includes a ring-shaped platform 40 having a hole 42 defined therein (see FIGS. 12–13). The platform 40 is located in the cavity 26 of the body 20 as shown in FIG. 3. A spring 44 is interposed between the platform 40 and a ledge 46 of the body 20. The spring 44 functions to urge the platform 40 in the direction of arrow 48.

The base mechanism 16 also includes a bit coupler 50 positioned within the cavity 26 as shown in FIG. 3 (see also FIGS. 18–21). The bit coupler 50 has a stem portion 52 which is received into a recess 54 defined within the hex shank 22. The bit coupler 50 has defined therein an opening 56 adapted to receive a ball 58 as shown in FIG. 3. The bit coupler 50 further defines a cavity 60 adapted to receive a hex end 62 of the drill bit 14. The bit coupler 50 further includes an external recess 64 which is defined in an outer surface of the bit coupler 50. A retaining band 66 is positioned within the external recess as shown in FIG. 3 (see also FIGS. 14–17). The retaining band 66 has a hole 68 defined therein which partially receives the ball 58 therein as shown in FIG. 3.

When the base mechanism 16 is assembled, a spring space 70 is defined between the collar 34 and the body 20. A spring 72 is positioned in the spring space 70 and is contained therein by contact with the shoulder 28 and the annular sleeve 38. The spring 72 functions to urge the collar 34 in the direction of arrow 48. Movement of the collar 34 relative to the body 20 is limited due to an interior lip 74 of the collar 34 contacting the shoulder 28 of the body 20.

Figure 22:
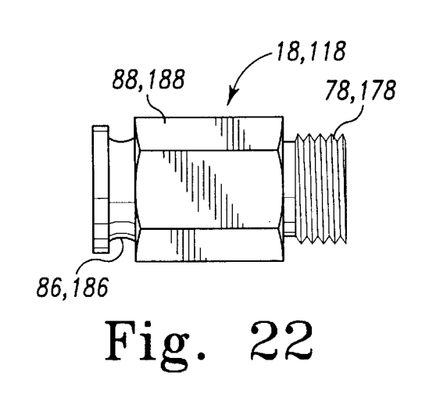
FIG. 22 is a side elevational view of the adapter of the mandrel assembly of FIGS. 1 and 28.
Figure 23:
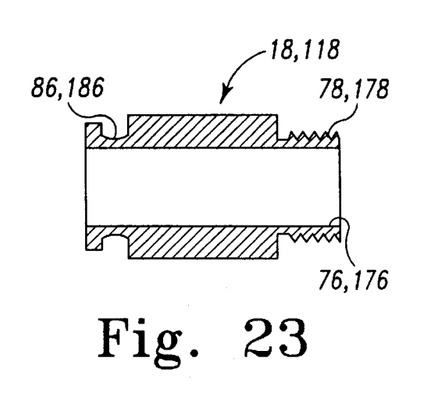
FIG. 23 is a cross sectional view of the adapter of FIG. 22.
Figure 24:
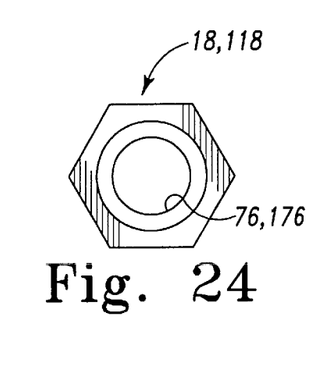
FIG. 24 is a rear elevational view of the adapter of FIG. 22.
Figure 25:
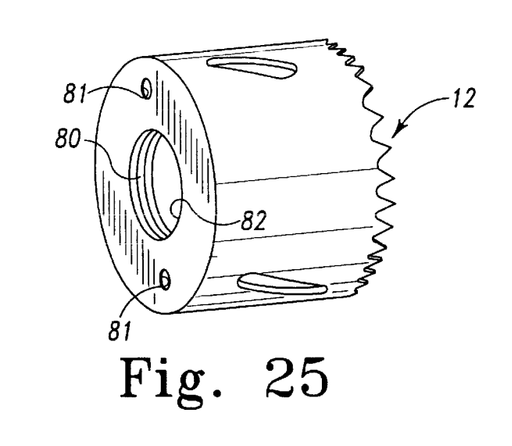
FIG. 25 is a perspective view of a hole saw which is usable with the mandrel assembly of FIGS. 1 and 28.
Figure 26:
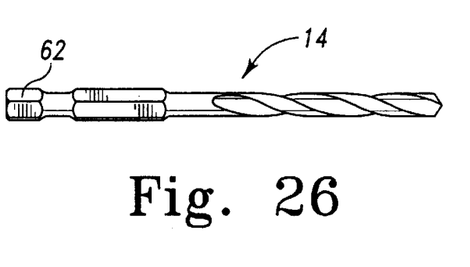
FIG. 26 is a side elevational view of a drill bit that is usable with the mandrel assembly of FIGS. 1 and 28.
Figure 27:
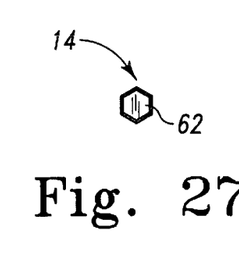
FIG. 27 is an end elevational view of the pilot drill bit of FIG. 26.

FIG. 3 shows the adapter 18 coupled to the base mechanism 16. The adapter 18 has a passageway 76 extending therethrough (see also FIGS. 23 and 24). A set of external threads 78 are provided on one end portion of the adapter 18 (see FIGS. 3 and 22–23). The external threads 78 are configured to cooperate with a set of internal threads 80 defined in an opening 82 of the hole saw 12 (see FIG. 25) so as to attach the hole saw 12 to the mandrel assembly 10. The exterior surface of the adapter 18 possesses a hexagonal shape while the cavity 26 defined by the interior surface of the body 20 possesses a complementary hexagonal shape. As a result, rotation of the body 20 causes rotational force to be transmitted to the adapter 18. In turn, rotation of the adapter 18 causes the hole saw 12 to rotate.

The drill bit 14 is maintained in the passageway 76 of the adapter 18 due to the cooperation of bit coupler 50 and the ball 58. In particular, a groove 84 defined in the hex end 62 of the drill bit 14 receives the ball 58 so as to lock the drill bit 14 in adapter 18 (and consequently in the mandrel assembly 10) as shown in FIG. 3.

The adapter 18 has a groove 86 defined in a sidewall 88 thereof. The adapter 18 is maintained in the cavity 26 of the body 20 due to the cooperation of the groove 86 and the ball 32. In particular, the groove 86 receives the ball 32 so as to lock the adapter 18 in the mandrel assembly 10 as shown in FIG. 3.

It should be appreciated from FIG. 1 that during use of the mandrel assembly 10, the hex shank 22 is secured within the chuck of the electric drill (not shown). Further, the drill bit 14 and the hole saw 12 are attached to the mandrel assembly 10 as described above.

Second Embodiment

Figure 28:
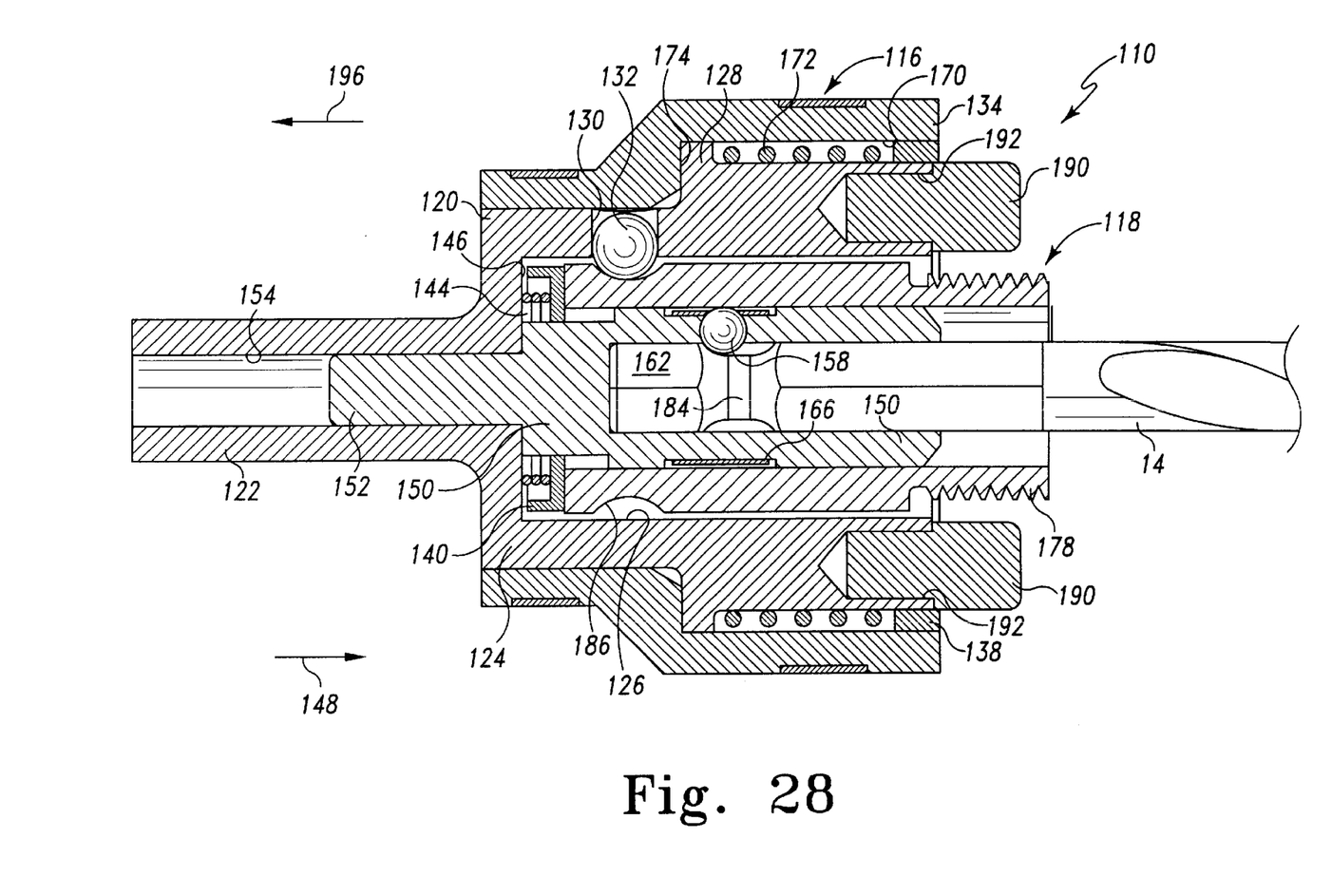
FIG. 28 is a sectional view of a second embodiment of a mandrel assembly that incorporates the features of the present invention therein.
Figure 29:
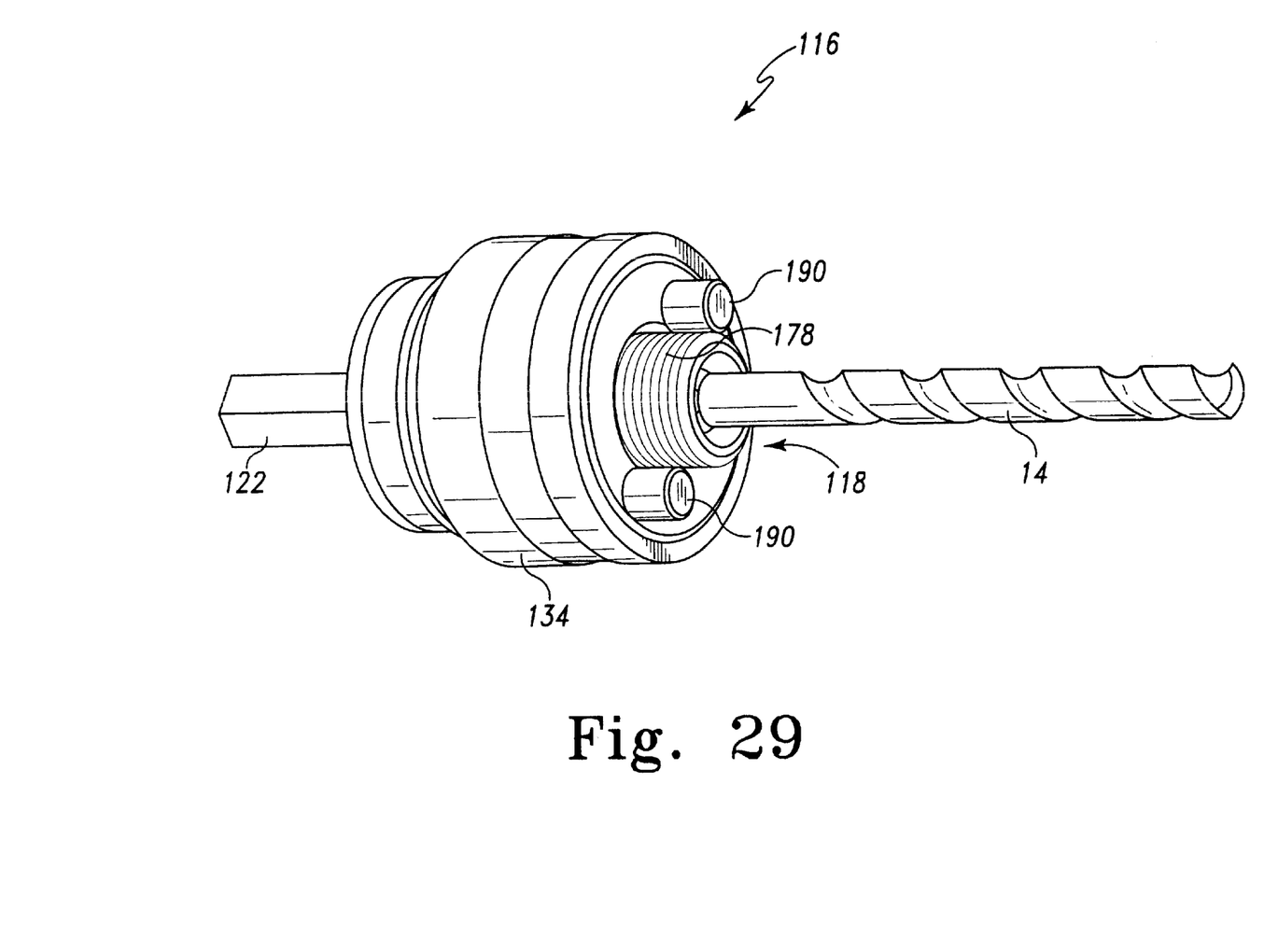
FIG. 29 is a perspective view of the mandrel assembly of FIG. 28.

Referring now to FIGS. 28–29, there is shown a second embodiment of a mandrel assembly 110 which is adapted to attach the hole saw 12 and the pilot drill bit 14 to an electric drill (not shown). The mandrel assembly 110 also includes two main components, namely, a base mechanism 116 and an adapter 118.

As shown in FIGS. 28–32, the base mechanism 116 includes a body 120 having a hexagonally-shaped shank 122 which is configured to be received within a chuck of the electric drill (not shown). The body 120 includes a substantially cylindrical portion 124 which defines a cavity 126. The body 120 is formed to include a shoulder 128 which extends outwardly from the cylindrical portion 124. The cylindrical portion 124 has defined therein an opening 130 adapted to receive a ball 132 as shown in FIG. 28.

Figure 33:
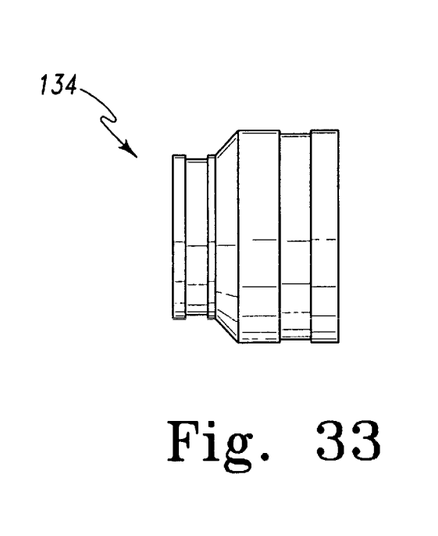
FIG. 33 is a side elevational view of the collar of the mandrel assembly of FIG. 28.
Figure 34:
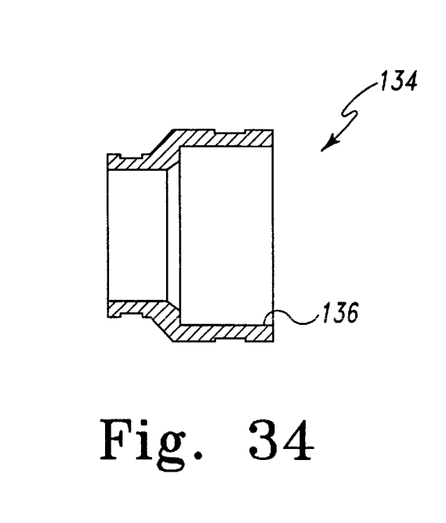
FIG. 34 is a cross sectional view of the collar of the FIG. 33.
Figure 35:
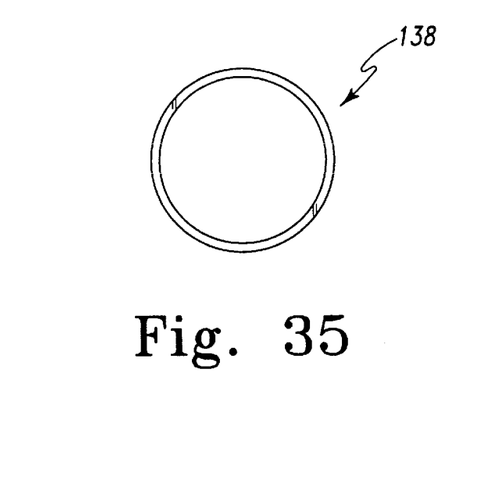
FIG. 35 is a front elevational view of the annular sleeve of the mandrel assembly of FIG. 28.
Figure 36:
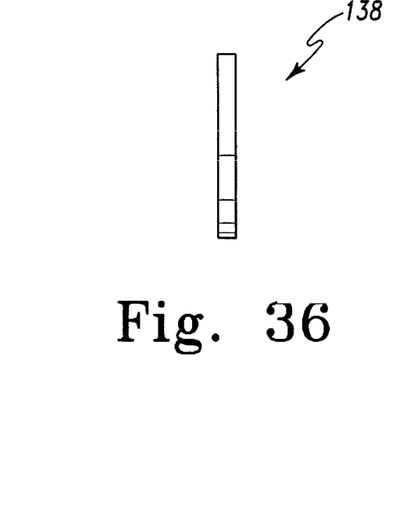
FIG. 36 is a side elevational view of the annular sleeve of FIG. 35.

The base mechanism 116 further includes a collar 134 which is movable in relation to the body 120 (see FIGS. 28 and 33–34). The collar 134 is positioned around the cylindrical portion 124 of the body 120 as shown in FIG. 28. The collar 134 defines a passageway 136 extending therethrough. An annular sleeve 138 is attached to the collar 134 and positioned within the passageway 136.

Additionally, the base mechanism 116 includes a ring-shaped platform 140 having a hole 142 defined therein (see FIGS. 12–13). The platform 140 is located in the cavity 126 of the body 120 as shown in FIG. 29. A spring 144 is interposed between the platform 140 and a ledge 146 of the body 120. The spring 144 functions to urge the platform 140 in the direction of arrow 148.

The base mechanism 116 also includes a bit coupler 150 positioned within the cavity 126 as shown in FIG. 28 (see also FIGS. 18–21). The bit coupler 150 has a stem portion 152 which is received into a recess 154 defined within the hex shank 122. The bit coupler 150 has defined therein an opening 156 adapted to receive a ball 158 as shown in FIG. 28. The bit coupler 150 further defines a cavity 160 adapted to receive a hex end 162 of the drill bit 14. The bit coupler 150 further includes an external recess 164 which is defined in an outer surface of the bit coupler 150. A retaining band 166 is positioned within the external recess as shown in FIG. 28 (see also FIGS. 14–17). The retaining band 166 has a hole 168 defined therein which partially receives the ball 158 therein as shown in FIG. 28.

When the base mechanism 116 is assembled, a spring space 170 is defined between the collar 134 and the body 120. A spring 172 is positioned in the spring space 170 and is contained therein by contact with the shoulder 128 and the annular sleeve 138. The spring 172 functions to urge the collar 134 in the direction of arrow 148. Movement of the collar 134 relative to the body 120 is limited due to an interior lip 174 of the collar 134 contacting the shoulder 128 of the body 120.

Figure 30:
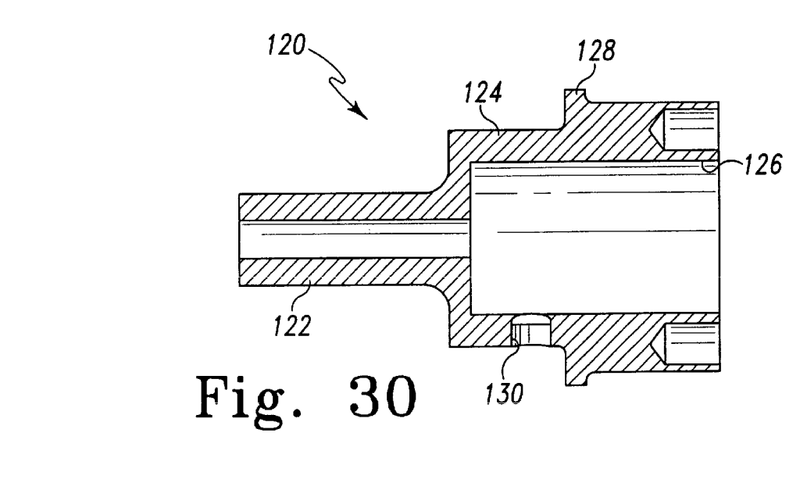
FIG. 30 is a cross sectional view of the body of the mandrel assembly of FIG. 28.
Figure 31:
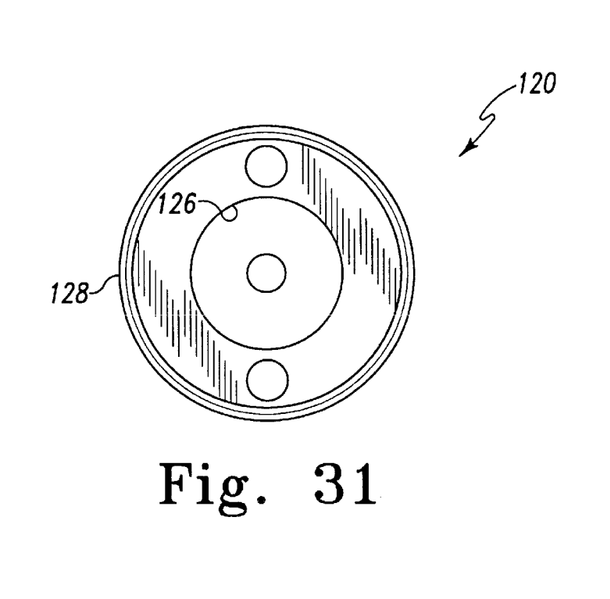
FIG. 31 is a front elevational view of the body of FIG. 30.
Figure 32:
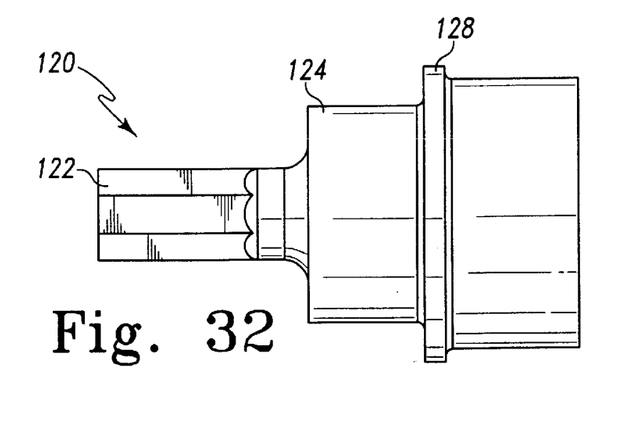
FIG. 32 is a side elevational view of the body of FIG. 30.

FIG. 28 shows the adapter 118 coupled to the base mechanism 116. The adapter 118 has a passageway 176 extending therethrough (see FIGS. 22–23). A set of external threads 178 are provided on one end portion of the adapter 118 (see FIGS. 28 and 22–23). The external threads 178 are configured to cooperate with a set of internal threads 80 defined in an opening 82 of the hole saw 12 (see FIG. 25) so as to attach the hole saw 12 to the mandrel assembly 110. The exterior surface of the adapter 118 possesses a hexagonal shape while the cavity 126 defined by the interior surface of the body 120 possesses a cylindrical shape as shown in FIGS. 30–31.

The drill bit 14 is maintained in the passageway 176 of the adapter 118 due to the cooperation of bit coupler 150 and the ball 158. In particular, a groove 184 defined in the hex end 162 of the drill bit 14 receives the ball 158 so as to lock the drill bit 14 in adapter 118 (and consequently in the mandrel assembly 110) as shown in FIG. 28.

The adapter 118 has a groove 186 defined in a sidewall 188 thereof. The adapter 118 is maintained in the cavity 126 of the body 120 due to the cooperation of the groove 186 and the ball 132. In particular, the groove 186 receives the ball 132 so as to lock the adapter 118 in the mandrel assembly 110 as shown in FIG. 28.

The mandrel assembly 110 further includes a pair of pins 190 which are respectively secured within a pair of apertures 192 defined in the body 120 as shown in FIG. 28. In order to attach the hole saw 12 to the mandrel assembly 110, initially, the adapter 118 is coupled to the hole saw 12 by meshingly engaging the external threads 178 of the adapter 110 with the internal threads 80 of the hole saw until the adapter 118 is secured to the hole saw 12. Then, the adapter 118 with the hole saw 12 attached thereto is advanced into the cavity 126 of the body 120. Simultaneously, the collar 134 is urged in the direction of arrow 196 against the spring bias of spring 172 thereby allowing ball 132 to move away as the adapter pushes against the platform 140. Once the groove 186 is aligned with the ball 132, a user may release the collar 134 thereby allowing it to move in the direction of arrow 148 due to the bias of spring 172. Once the adapter 118 with the hole saw 12 attached thereto is advanced into the cavity 126 of the body 120, the pair of pins 190 are respectively positioned within a pair of openings 81 defined in the hole saw (see FIG. 25). As a result, rotation of the body 120 causes rotational force to be transmitted to the pair of pins 190. In turn, rotation of the pair of pins 190 causes the hole saw 12 to rotate.

During use of the mandrel assembly 110, the hex shank 122 is secured within the chuck of the electric drill (not shown). Further, the drill bit 14 and the hole saw 12 are attached to the mandrel assembly 110 as described above.

It should be appreciated that in both embodiments the drill bit 14 may be removed from the bit coupler 50, 150 only if the adapter 18, 118 is not positioned in the cavity 26, 126 of the body 20, 120. Once the adapter 18, 118 is positioned within the cavity 26, 126, the drill bit 14 is locked in place because the inner wall of the adapter 18, 118 prevents the ball 58, 158 from disengaging the surface defined by the groove 84, 184 of the drill bit 14.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

There is a plurality of advantages of the present invention arising from the various features of the mandrel assembly described herein. It will be noted that alternative embodiments of the mandrel assembly of the present invention may not include all of the features described yet still benefit from at least some of the advantages of such features. Those of ordinary skill in the art may readily devise their own implementations of the mandrel assembly that incorporate one or more of the features of the present invention and fall within the spirit and scope of the present invention as defined by the appended claims.

What is claimed is:

1. A mandrel assembly for use with a hole saw and a drill bit, comprising:

a body having a shank portion and an adapter receiving portion, said adapter receiving portion defining an adapter receiving cavity and including a first wall having a first detent hole extending therethrough;

a bit coupler secured to said body, said bit coupler being located within said adapter receiving cavity and defining a drill bit receiving portion, said drill bit receiving portion including a bit receiving cavity and a second wall having a second detent hole extending therethrough;

an adapter configured to be received within said adapter receiving cavity, said adapter having an externally threaded portion configured to meshingly engage with a set of internal threads of said hole saw, said adapter further having a first detent groove defined in an outer surface thereof;

a first ball detent located within said first detent hole of said body and configured to be received within said first detent groove of said adapter; and a second ball detent located within said second detent hole of said bit coupler and configured to be received within a second detent groove of said drill bit.

2. The mandrel assembly of claim 1, further comprising:

a collar assembly positioned around said body, said collar assembly being movable between a first position and a second position; and a spring positioned in contact with said body and said collar assembly, said spring biasing said collar assembly into said first position.

3. The mandrel assembly of claim 2, wherein:

said collar assembly includes (i) a collar having a collar passageway extending therethrough, and (ii) a sleeve attached to said collar and positioned within said collar passageway, a spring space is defined between said body and said collar when said body is located within said collar passageway, and said spring is located within said spring space.

4. The mandrel assembly of claim 3, wherein:

said first wall of said adapter receiving portion of said body includes an external shoulder, and said spring is retained between said external shoulder and said sleeve of said collar assembly.

5. The mandrel assembly of claim 1, wherein:

said shank portion of said body has a recess defined therein, said bit coupler further includes a stem portion, and said stem portion is located in said recess.

6. The mandrel assembly of claim 1, wherein:

said adapter defines an adapter passageway, and said drill bit receiving portion of said bit coupler is located within said adapter passageway.

7. The mandrel assembly of claim 1, further comprising:

a platform member positioned within said adapter receiving cavity, said platform member being interposed between said adapter and said body, and a spring interposed between said platform member and said body.

8. The mandrel assembly of claim 1, further comprising a drive pin positioned within an aperture defined in said body, said drive pin being configured to be received within an opening defined in said hole saw.

9. A cutting assembly, comprising:

a hole saw having a set of internal threads;

a body having a shank portion and an adapter receiving portion, said adapter receiving portion defining an adapter receiving cavity and including a first wall having a first detent hole extending therethrough;

a bit coupler located within said adapter receiving cavity and defining a drill bit receiving portion, said drill bit receiving portion including a bit receiving cavity and a second wall having a second detent hole extending therethrough;

an adapter configured to be received within said adapter receiving cavity, said adapter having external threads which engage internal threads of said hole saw, said adapter further having a first detent groove defined therein;

a first ball detent located within said first detent hole of said body and configured to be received within said first detent groove of said adapter;

a drill bit configured to be received within said drill bit receiving portion of said bit coupler, said drill bit having a second detent groove defined therein; and a second ball detent located within said second detent hole of said bit coupler and configured to be received within said second detent groove of said drill bit.

10. A mandrel assembly for use with a hole saw and a drill bit, comprising:

a body having (i) a shank portion configured to be received in a chuck of a drill, and (ii) an adapter receiving portion that includes a detent hole extending through a wall thereof and further that defines an adapter receiving cavity;

a bit coupler secured to said body, said bit coupler being located within said adapter receiving cavity and defining a drill bit receiving portion;

an adapter configured to be received within said adapter receiving cavity, said adapter having a first coupling portion configured to cooperate with a second coupling portion of said hole saw, said adapter further having a detent groove defined therein; and a detent located within said detent hole of said body and configured to be received within said detent groove of said adapter.

11. The mandrel assembly of claim 10, further comprising:

a collar assembly positioned around said body, said collar assembly being movable between a first position and a second position; and a spring positioned in contact with said body and said collar assembly, said spring biasing said collar assembly into said first position.

12. The mandrel assembly of claim 11, wherein:

said collar assembly includes (i) a collar having a collar passageway extending therethrough, and (ii) a sleeve attached to said collar and positioned within said collar passageway, a spring space is defined between said body and said collar when said body is located within said collar passageway, and said spring is located within said spring space.

13. The mandrel assembly of claim 12, wherein:

said first wall of said adapter receiving portion of said body includes an external shoulder, and said spring is retained between said external shoulder and said sleeve of said collar assembly.

14. The mandrel assembly of claim 10, wherein:

said shank portion of said body has a recess defined therein, said bit coupler further includes a stem portion, and said stem portion is located in said recess.

15. The mandrel assembly of claim 10, wherein:

said adapter defines an adapter passageway, and said drill bit receiving portion of said bit coupler is located within said adapter passageway.

16. The mandrel assembly of claim 10, further comprising:

a platform member positioned within said adapter receiving cavity, said platform member being interposed between said adapter and said body, and a spring interposed between said platform member and said body.

17. The mandrel assembly of claim 10, further comprising a drive pin positioned within an aperture defined in said body, said drive pin being configured to be received within an opening defined in said hole saw.

18. The mandrel assembly of claim 10, wherein said detent is a ball detent.

19. The mandrel assembly of claim 10, wherein:

said first coupling portion of said adapter includes an externally threaded portion, said second coupling portion of said hole saw includes a set of internal threads, and said externally threaded portion is configured to cooperate with said set of internal threads in order to secure said hole saw to said adapter.

20. The mandrel assembly of claim 1, wherein said adapter is locked within said adapter receiving cavity of said body when said first ball detent is received within said first detent groove of said adapter.

21. The mandrel assembly of claim 20, wherein said adapter is interposed between said body and said bit coupler when said adapter is locked within said adapter receiving cavity of said body.

22. The mandrel assembly of claim 1, wherein said adapter is advanced in a direction away from said shank portion of said body in response to movement of said first ball detent out of said first detent groove of said adapter.

23. The mandrel assembly of claim 1, wherein said bit coupler remains fixed in relation to said shank portion while said adapter is advanced in a direction away from said shank portion.

24. The mandrel assembly of claim 7, wherein said spring is configured to urge said adapter in a direction away from said shank portion of said body in response to movement of said first ball detent out of said first detent groove of said adapter.

25. The mandrel assembly of claim 1, wherein said adapter is removably coupled to said body.

26. The mandrel assembly of claim 25, wherein said adapter is located within said adapter receiving cavity of said body while said adapter is coupled to said body.

* * * * *